(12) United States Patent
Liu (10) Patent No.: US 11,184,305 B2
(45) Date of Patent: Nov. 23, 2021

(54) METHOD AND APPARATUS FOR UPDATING GROUP MEMBER DATA, AND TERMINAL, SYSTEM AND STORAGE MEDIUM

(71) Applicant: Beijing Dajia Internet Information Technology Co., Ltd., Beijing (CN)

(72) Inventor: Shuo Liu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/147,119

(22) Filed: Jan. 12, 2021

(65) Prior Publication Data

US 2021/0136017 A1    May 6, 2021

Related U.S. Application Data

(63) Continuation of application No. PCT/CN2019/096614, filed on Jul. 18, 2019.

(30) Foreign Application Priority Data

Jul. 25, 2018  (CN) .......................... 201810824304.8

(51) Int. Cl.
   *H04L 12/58*   (2006.01)
   *H04L 9/06*    (2006.01)
   *H04L 29/08*   (2006.01)

(52) U.S. Cl.
   CPC ............ *H04L 51/12* (2013.01); *H04L 9/0643* (2013.01); *H04L 51/043* (2013.01); *H04L 51/16* (2013.01); *H04L 51/22* (2013.01); *H04L 67/1095* (2013.01)

(58) Field of Classification Search
   CPC ..... H04L 51/12; H04L 9/0643; H04L 51/043; H04L 51/16; H04L 51/22; H04L 67/1095;
   (Continued)

(56) References Cited

U.S. PATENT DOCUMENTS 7,739,309 B2 *  6/2010  Singh ................... G06F 40/186
                                                 707/802
8,059,809 B1 * 11/2011  Zhang .................... H04W 76/45
                                                 379/211.04

(Continued)

FOREIGN PATENT DOCUMENTS

| CN | 103326933 A | 9/2013 |
|---|---|---|
| CN | 103491156 A | 1/2014 |

(Continued)

OTHER PUBLICATIONS

International Search Report for International Application No. PCT/CN2019/096614 dated Oct. 8, 2019.

(Continued)

*Primary Examiner* — Ninos Donabed
(74) *Attorney, Agent, or Firm* — Meunier Carlin & Curfman LLC (57) ABSTRACT

A method and apparatus for updating group member data are provided. The method includes: sending a group member data update request carrying a terminal timestamp to a server; receiving group member data change information issued by the server, wherein the group member data change information includes group member change data between the current timestamp and the terminal timestamp, and the current timestamp is greater than the terminal timestamp; and updating group member data of the terminal based on the group member data change information.

3 Claims, 6 Drawing Sheets

(58) Field of Classification Search
CPC . H04L 12/1822; H04L 63/062; H04L 63/065;
H04L 63/123; H04L 63/126; H04L
9/0822; H04L 9/0825; H04L 9/0833;
H04L 9/0891; G06F 21/6218; G06F
11/1458; G06F 16/23; G06F 16/27; G06F
3/0607; G06F 3/0632
See application file for complete search history.

(56) References Cited

U.S. PATENT DOCUMENTS

| | | | | |
|---|---|---|---|---|
| 2002/0196922 | A1* | 12/2002 | Marwell | H04M 3/51 379/218.01 |
| 2003/0046433 | A1* | 3/2003 | Luzzatti | H04L 67/1095 709/248 |
| 2004/0133538 | A1* | 7/2004 | Amiri | G06F 16/24539 |
| 2004/0151300 | A1* | 8/2004 | Marwell | H04M 3/4933 379/265.13 |
| 2005/0086376 | A1* | 4/2005 | Park | H04L 67/24 709/245 |
| 2005/0164651 | A1* | 7/2005 | Ollis | G06Q 10/10 455/100 |
| 2007/0097974 | A1* | 5/2007 | Ward | H04L 45/46 370/392 |
| 2007/0168443 | A1 | 7/2007 | Morgan | |
| 2008/0046478 | A1* | 2/2008 | Mandre | G06Q 10/00 |
| 2009/0029676 | A1* | 1/2009 | Thalapaneni | H04L 61/1594 455/411 |
| 2009/0181653 | A1* | 7/2009 | Alharayeri | H04L 67/306 455/414.1 |
| 2009/0222493 | A1* | 9/2009 | Smarr | G06F 16/23 |
| 2010/0091763 | A1* | 4/2010 | Thompson | H04L 29/12132 370/352 |
| 2011/0050164 | A1* | 3/2011 | Partovi | H02J 7/00034 320/108 |
| 2011/0264621 | A1* | 10/2011 | Burjoski | H04L 61/1552 707/610 |
| 2012/0226780 | A1* | 9/2012 | Knight | H04L 67/306 709/219 |
| 2013/0244622 | A1* | 9/2013 | Hillier | H04M 1/72412 455/414.1 |
| 2013/0262608 | A1* | 10/2013 | Wang | H04L 51/00 709/206 |
| 2014/0156770 | A1* | 6/2014 | Zheng | G06F 16/9535 709/206 |
| 2014/0344578 | A1* | 11/2014 | Kim | H04W 12/04 713/168 |
| 2015/0312331 | A1* | 10/2015 | Crocker | H04L 63/061 709/205 |
| 2016/0308964 | A1* | 10/2016 | Luo | H04L 12/185 |
| 2017/0012987 | A1* | 1/2017 | Gupta | G06F 16/13 |
| 2019/0132448 | A1* | 5/2019 | Hengsterman | H04M 3/4938 |

FOREIGN PATENT DOCUMENTS

| | | |
|---|---|---|
| CN | 104348849 A | 2/2015 |
| CN | 106899624 A | 6/2017 |
| CN | 107656936 A | 2/2018 |
| CN | 108989062 A | 12/2018 |

OTHER PUBLICATIONS

Decision to Grant for Chinese Application No. 201810824304.8 dated Mar. 26, 2020.

Second Office Action for Chinese Application No. 201810824304.8 dated Aug. 15, 2019.

* cited by examiner

METHOD AND APPARATUS FOR UPDATING GROUP MEMBER DATA, AND TERMINAL, SYSTEM AND STORAGE MEDIUM

CROSS REFERENCE TO RELATED APPLICATIONS

The present application is the continuation application of International Application No. PCT/CN2019/096614, filed on Jul. 18, 2019, which is based on and claims priority to Chinese Patent Application No. 201810824304.8, filed with the China National Intellectual Property Administration on Jul. 25, 2018 and entitled "Method and Apparatus for Updating Group Member Data, and Terminal, System and Storage Medium", which is hereby incorporated by reference in its entirety.

FIELD

The present disclosure relates to the field of computer technology, and in particular to a method and an apparatus for updating group member data, and a terminal, a system and a storage medium thereof.

BACKGROUND

The Instant messaging (IM for short) refers to a service that can send and receive Internet messages instantly. With the development of the Internet, the IM has developed to a comprehensive information platform integrating the communication, information, entertainment, search, e-commerce, office collaboration, corporate customer service, etc., so that the users' dependence on the instant messaging products are also increasingly high. In order to facilitate the effective communication, the inventor found that most users would choose to share the instant information by establishing groups. When the instant messaging group function is implemented, the user list needs to be synchronized to the client. In the related technologies, the users can join or exit a group, while the client only knows how many members there are in the current group but does not know which user has joined or exited, so the user list is synchronized to the client by full data synchronization. However, the inventor realizes that full data synchronization consumes the bandwidth and traffic significantly, and if there are not many changed members each time, it means that most of the data in the full synchronized data is redundant data.

SUMMARY

According to a first aspect of the embodiments of the present disclosure, a method for updating group member data is provided. The method includes: sending a group member data update request to a server, wherein the group member data update request carries a terminal timestamp; receiving group member data change information issued by the server, wherein the group member data change information includes group member change data between a current timestamp and the terminal timestamp, and the current timestamp is greater than the terminal timestamp; updating the group member data of a terminal based on the group member data change information.

According to a second aspect of the embodiments of the present disclosure, a method for updating group member data is provided. The method includes: detecting, by a server, the group member data periodically and recording group member data in a current timestamp; sending, by a terminal, a group member data update request to the server periodically, wherein the group member data update request carries a terminal timestamp; issuing, by the server, group member data change information to the terminal, wherein the group member data change information includes group member change data between the current timestamp and the terminal timestamp, and the current timestamp is greater than the terminal timestamp; updating, by the terminal, the group member data of the terminal based on the group member data change information.

According to a third aspect of the embodiments of the present disclosure, an apparatus for updating group member data is provided. The apparatus includes: a first sending unit configured to send a group member data update request to a server, wherein the group member data update request carries a terminal timestamp; a first receiving unit configured to receive group member data change information issued by the server, wherein the group member data change information includes group member change data between a current timestamp and the terminal timestamp, and the current timestamp is greater than the terminal timestamp; a first update unit configured to update the group member data of a terminal based on the group member data change information.

According to a fourth aspect of the embodiments of the present disclosure, an apparatus for updating group member data is provided. The apparatus includes: a recording unit configured to detect the group member data periodically and record group member data in a current timestamp by a server; a third sending unit configured to send a group member data update request by a terminal to the server periodically, wherein the group member data update request carries a terminal timestamp; an issuing unit configured to issue group member data change information to the terminal by the server, wherein the group member data change information includes group member change data between the current timestamp and the terminal timestamp, and the current timestamp is greater than the terminal timestamp; a second update unit configured to update the group member data of the terminal based on the group member data change information by the terminal.

According to a fifth aspect of the embodiments of the present disclosure, a terminal is provided. The terminal includes: a processor; a memory configured to store instructions executable by the processor; wherein the processor is configured to: send a group member data update request to a server, wherein the group member data update request carries a terminal timestamp; receive group member data change information issued by the server, wherein the group member data change information includes group member change data between a current timestamp and the terminal timestamp, and the current timestamp is greater than the terminal timestamp; update the group member data of a terminal based on the group member data change information.

According to a sixth aspect of the embodiments of the present disclosure, a system is provided. The system includes: a server and a terminal; the server includes a processor and a memory configured to store instructions executable by the processor; wherein the processor is configured to: detect group member data periodically and record group member data in a current timestamp; issue group member data change information to the terminal, wherein the group member data change information includes group member change data between the current timestamp and the terminal timestamp, and the current timestamp is greater than the terminal timestamp; the terminal includes a processor and a memory configured to store instructions executable by the processor; wherein the processor is configured to: send a group member data update request to the server periodically, wherein the group member data update request carries a terminal timestamp; update the group member data of a terminal based on the group member data change information.

According to a seventh aspect of the embodiments of the present disclosure, a non-transitory computer-readable storage medium is provided. The storage medium stores the instructions that, when executed by a processor of a terminal, cause the terminal to perform: sending a group member data update request to a server, wherein the group member data update request carries a terminal timestamp; receiving group member data change information issued by the server, wherein the group member data change information includes group member change data between a current timestamp and the terminal timestamp, and the current timestamp is greater than the terminal timestamp; updating the group member data of a terminal based on the group member data change information.

According to an eighth aspect of the embodiments of the present disclosure, a computer program is provided. The computer program includes: computer readable codes that, when run on a terminal, cause the terminal to perform: sending a group member data update request to a server, wherein the group member data update request carries a terminal timestamp; receiving group member data change information issued by the server, wherein the group member data change information includes group member change data between a current timestamp and the terminal timestamp, and the current timestamp is greater than the terminal timestamp; updating the group member data of a terminal based on the group member data change information.

It should be understood that the above general description and the following detailed description are only exemplary and illustrative, and cannot limit the present disclosure.

DETAILED DESCRIPTION

In order to enable those skilled in the art to better understand the technical solutions of the disclosure, the technical solutions in the embodiments of the disclosure will be described clearly and completely with reference to the accompanying drawings in the embodiments of the disclosure.

Some processes described in the specification and claims of the disclosure and the above drawings include multiple operations appearing in a particular order, but it should be clearly understood that these operations may not be performed in the order appearing herein or may be performed in parallel. The order numbers of operations such as 11 and 12 are only used to distinguish different operations, and the order number itself does not represent any execution sequence. In addition, these processes may include more or fewer operations, and these operations may be performed sequentially or in parallel. It should be noted that the terms such as "first", "second" and the like herein are used to distinguish different messages, devices, modules, etc., do not represent the sequence, and do not limit "first" and "second" as different types either.

The technical solutions in the embodiments of the disclosure will be described clearly and completely below in combination with the accompanying drawings in the embodiments of the present application. Obviously the described embodiments are only a part of the embodiments of the disclosure but not all the embodiments. Based upon the embodiments of the disclosure, all of other embodiments obtained by those skilled in the art without creative work pertain to the protection scope of the disclosure.

Figure 1:
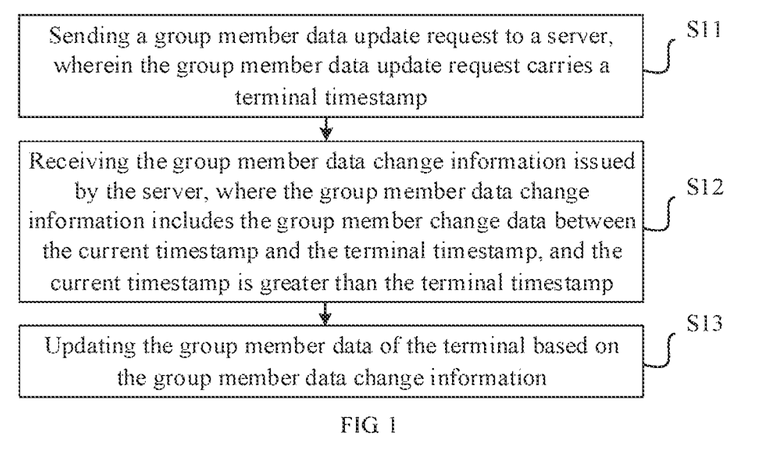
FIG. 1 illustrates a flow chart of a method for updating the group member data according to some embodiments of the disclosure.

FIG. 1 is a flow chart of a method for updating the group member data according to some embodiments. As shown in FIG. 1, the method for updating group member data is used in a terminal and includes the following steps.

Step S11: sending to a server a group member data update request carrying a terminal timestamp.

In some embodiments, the server includes a group management server, which is configured to manage the change status of group members and store the group member data. The group member data includes a group member list that the terminal needs to synchronize when realizing the instant messaging function, where the list is used to reflect the number of members and the member information in the current group. The data update request is a request of the terminal for requesting the server to issue the group member data change information to update the group member data stored in itself.

In an embodiment of the disclosure, the timestamp refers to a latest timestamp of the service data, and is issued by the server but not the local clock time of the terminal.

The terminal timestamp is the largest timestamp corresponding to the data stored by the terminal. The timestamp is carried each time when the terminal requests the data from the server, and the server issues the data information, where the timestamp corresponding to the issued data information is larger than the timestamp carried in this request. The terminal stores the timestamp locally after receiving it, and when the data is requested again, the largest timestamp in the current data set is carried next time.

The terminal sending the data update request to the server may be regular sending, periodic sending, or artificially controlled sending. When the terminal detects that it currently needs to send a data update request to the server, the terminal sends the data update request to the server, wherein the data update request carries the terminal timestamp. After sending the data update request, the terminal waits for the server's feedback within a preset time. If the server doesn't feed back, the terminal determines that there is no need to update the group member data stored on the terminal. In addition, after the server receives the data update request sent by the terminal, if there is no need to send any data such as the group member data change information to the terminal, the server may further feed back the information that there is no need to update the group member data or the empty information to the terminal, and at this time, the terminal records that there is no need to update the group member data on the terminal timestamp corresponding to the data update request currently sent.

Step S12: receiving the group member data change information issued by the server, where the group member data change information includes the group member change data between the current timestamp and the terminal timestamp, and the current timestamp is greater than the terminal timestamp.

In some embodiments, the current timestamp is the timestamp recorded and stored when the server updated the group member data last time. When the server receives a data update request carrying the terminal timestamp sent by the terminal, the server obtains the terminal timestamp and compares the terminal timestamp with the current timestamp. If the current timestamp is greater than the terminal timestamp, the server issues the group member data change information to the terminal; and if the current timestamp is equal to the terminal timestamp, the server does not need to issue any group member data. The group member data change information may be the data received by the server when the group member data was updated last time, and is the group member data (including the data of members joining group and/or the data of members leaving group) received by the server during the time interval [terminal timestamp, current timestamp], or may be the change information obtained by the server by comparing the group member data in the current timestamp with the group member data in the terminal timestamp.

In some embodiments, when the timestamp is recorded with an offset, the offset corresponding to the current timestamp is greater than or equal to the offset corresponding to the terminal timestamp. In a first example, when the offset corresponding to the terminal timestamp is 1, the offset corresponding to the current timestamp is 1 or more; if the server issues the group member data change information to the terminal at this time, the current timestamp may be 2.

Step S13: updating the group member data of the terminal according to the group member data change information.

After the terminal receives the group member data change information issued by the server, it means that the terminal needs to update its own group member data. In this way, the terminal obtains the member change data in the group member data change information to update the group member data of the terminal, so that the group member data stored in the terminal at this time is the same as the group member data newly stored in the server.

Figure 2:
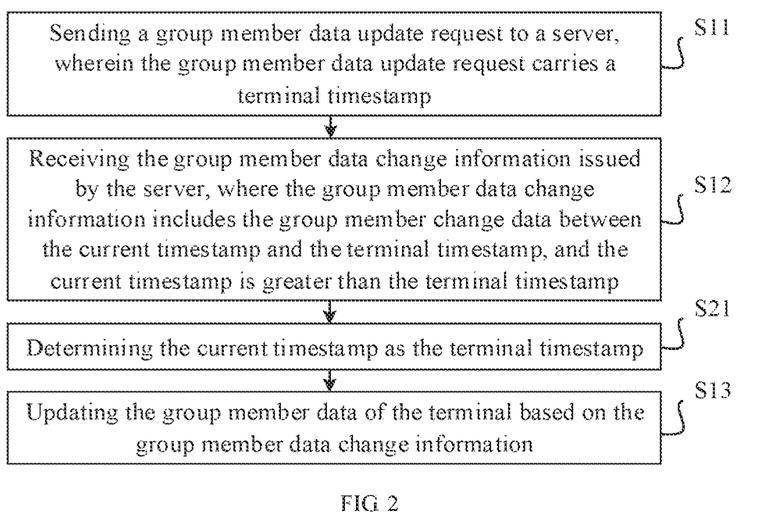
FIG. 2 illustrates a flow chart of a method for updating the group member data according to some embodiments of the disclosure.

Further, FIG. 2 is a flow chart of a method for updating the group member data according to some embodiments. As shown in FIG. 2, the group member data change information includes the current timestamp, wherein after the step S12 of receiving the group member data change information issued by the server, the method further includes the following step S21: determining the current timestamp as the terminal timestamp.

In some embodiments, the current timestamp in step S21 is the current timestamp contained in the group member data change information. The process of said determining the current timestamp as the terminal timestamp is: when receiving the group member change information issued by the server, the terminal obtains the current timestamp carried in the group member change information, and records it as the terminal timestamp corresponding to the current update of the group member data. At this time, the timestamp recorded on the terminal when the group member data was updated last time can be the same as the timestamp recorded on the server when the group member data was updated last time. In combination with the first example of the offset described above, the offset corresponding to the terminal timestamp at this time may be recorded by the terminal as 2, which is the same as the offset corresponding to the timestamp recorded in the server when the group member data was updated last time.

In addition, in some embodiments, the terminal timestamp may also be the corresponding timestamp when the terminal updated the group member data last time or the timestamp when the terminal sent a data update request to the server.

Figure 3:
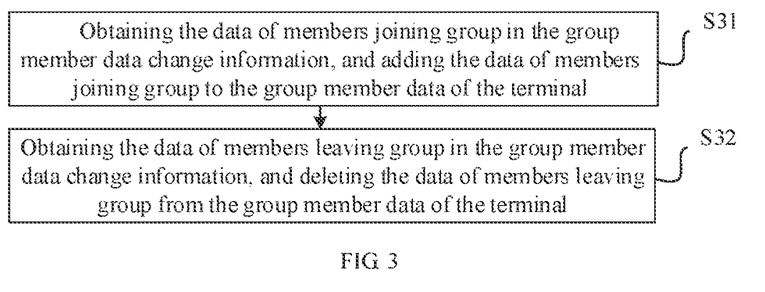
FIG. 3 illustrates a flow chart of a method for updating the group member data according to some embodiments of the disclosure.

Further, FIG. 3 is a flow chart of a method for updating the group member data according to some embodiments. As shown in FIG. 3, the group member change data includes joining group member data and/or leaving group member data. The step S13 of updating the group member data of the terminal based on the group member data change information includes the following steps.

Step S31: obtaining joining group member data in the group member data change information, and adding the joining group member data to the group member data of the terminal; and/or Step S32: obtaining leaving group member data in the group member data change information, and deleting the data of members leaving group from the group member data of the terminal.

In some embodiments, the status of a group member in the group is bound with its own data to form joining group member data and/or leaving group member data. The status (statue) includes joining group (added) and leaving group (deleted), and its own data includes uid and the changed timestamp. For example, for a member A, uid is 1001, statue is added, and Timestamp is 2018-07-09 09:08:23; so the group member data change information includes {"uid": 1001, "statue": "added", "Timestamp": "2018-07-09 09:08:23" }. For example, for a member B, uid is 1011, statue is deleted, and Timestamp is 2018-07-09 09:08:23; so the group member data change information includes {"uid": 1011, "statue": "deleted", "Timestamp": "2018-07-09 09:08:23"}. For the member A, uid is 1001, statue is deleted, and Timestamp is 2018-07-19 09:08:23: so the group member data change information includes {"uid": 1001, "statue": "deleted", "Timestamp": "2018-07-19 09:08:23"}. The two different states of the same member A belong to two pieces of data corresponding to the data of members joining group and the data of members leaving group respectively.

When the step of updating the group member data of the terminal based on the group member data change information is implemented on the terminal, the update can be performed by simple logics such as adding and deleting. For example: the uid of a member C in the member change data is obtained, and it is judged whether the group member data currently stored by the terminal contains the member C, and if not, the data of the member C is added, or the data of the member C is added after the status of the member C is confirmed as joining group (ADD). The uid of a member D in the member change data is obtained, and it is judged whether the group member data currently stored by the terminal contains the member D, and if so, the data of the member D is deleted, or the data of the member D is deleted after the status of the member C is confirmed as leaving group (DELETE).

Figure 4:
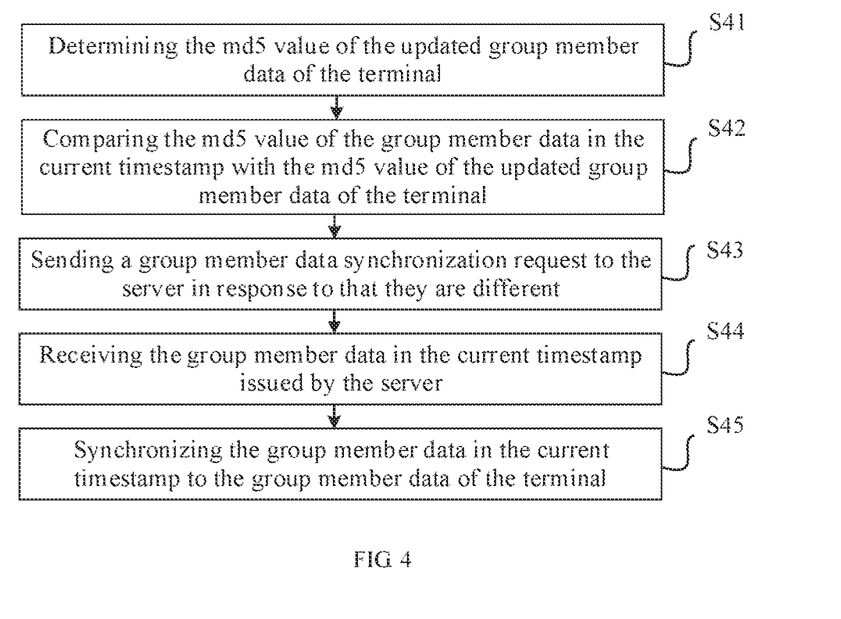
FIG. 4 illustrates a flow chart of a method for updating the group member data according to some embodiments of the disclosure.

Furthermore, FIG. 4 is a flow chart of a method for updating the group member data according to some embodiments. As shown in FIG. 4, the group member data change information includes the md5 value of the group member data in the current timestamp. In some embodiments, the md5 value of the group member data in the current timestamp is the value obtained by the server determining the md5 after the server sorts the members in the group member data corresponding to the current timestamp by uid, where the sorting method includes uid ascending or descending order. After the step S13 of updating the group member data of the terminal based on the group member data change information, the method further includes the following steps.

Step S41: determining the md5 value of the updated group member data of the terminal.

This step includes: sorting the members in the updated group member data of the terminal by uid, where the sorting rule is consistent with the sorting rule in the group member data corresponding to the current timestamp in the server. And the md5 value of the updated group member data of the terminal is determined by using the same algorithm as determining the md5 in the server based on the sorting result.

Step S42: comparing the md5 value of the group member data in the current timestamp with the md5 value of the updated group member data of the terminal.

Step S43: sending a group member data synchronization request to the server in response that they are different.

In some embodiments, if the md5 value of the group member data in the current timestamp is different from the md5 value of the updated group member data of the terminal (that is, the updated group member data of the terminal is different from the group member data in the current timestamp of the server, and the data update is incomplete), the terminal sends a group member data synchronization request to the server, wherein the synchronization request is to obtain the group member data corresponding to the current timestamp in the server. It is equivalent to pulling the full group member data in the current timestamp.

Step S44: receiving the group member data in the current timestamp issued by the server.

Step S45: synchronizing the group member data in the current timestamp to the group member data of the terminal.

In some embodiments, full synchronizing group member data in the current timestamp to the group member data of the terminal refers to updating all group member data stored on the terminal.

When the terminal synchronizes the group member data in the current timestamp to the group member data of the terminal, the timestamp corresponding to the newest group member data stored on the terminal is synchronously adjusted as the minimum value, and may be return to zero. If the offset is used to mark the corresponding timestamp, and when the terminal synchronizes the group member data in the current timestamp to the group member data of the terminal, the offset is determined as a value smaller than a positive integer, and may be 0 or −1, etc.

In these embodiments, by comparing the md5 value of the group member data in the current timestamp with the md5 value of the group member data in the terminal timestamp, it is further ensured that the updated group member data of the terminal is newest to ensure the accuracy of the data.

The method for updating the group member data shown in the above embodiment is applied to an instant messaging application, and the group member data is the group member data of a group established in the instant messaging application.

Figure 5:
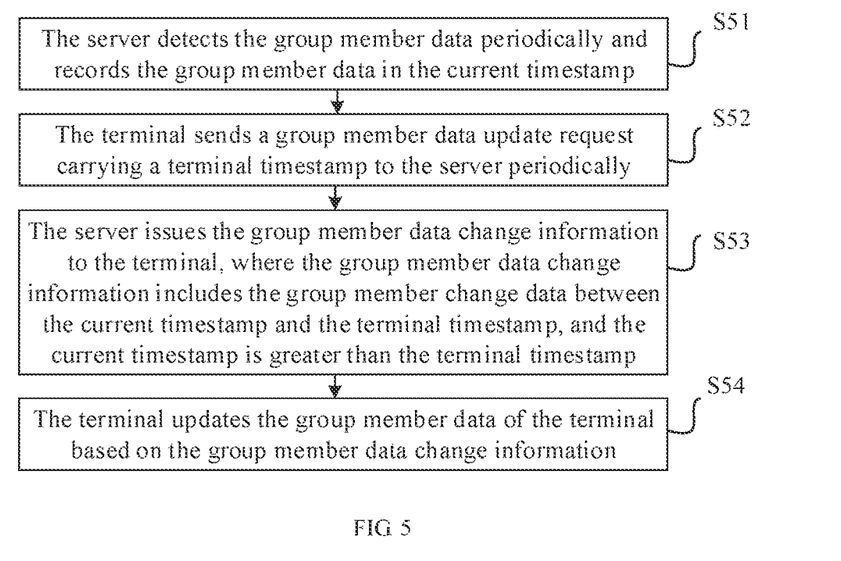
FIG. 5 illustrates a flow chart of a method for updating the group member data according to some embodiments of the disclosure.

FIG. 5 is a flow chart of a method for updating the group member data according to some embodiments. As shown in FIG. 5, the method for updating group member data is used in a system including a server and a terminal, and includes the following steps.

In the step S51: the server detects the group member data periodically and records the group member data in the current timestamp.

In some embodiments, when the server detects the group member data periodically, if there is member change data, the server performs the update of the group member data in servers and record the updated current timestamp. At this time, the group member data stored in the server is the group member data in the current timestamp.

In the step S52: the terminal sends a group member data update request carrying a terminal timestamp to the server periodically.

In the step S53: the server issues the group member data change information to the terminal, where the group member data change information includes the group member change data between the current timestamp and the terminal timestamp, and the current timestamp is greater than the terminal timestamp.

In some embodiments, the step S53 includes a step in which the server compares the current timestamp with the terminal timestamp, and when it is determined that the current timestamp is greater than the terminal timestamp, the group member data change information is issued to the terminal.

In the step S54: the terminal updates the group member data of the terminal based on the group member data change information.

Different from the above corresponding embodiments shown in FIGS. 1, 2, 3 and 4, the steps in the corresponding embodiments shown in FIG. 5 are performed by the server in cooperation with the terminal, which can inherit the steps in the above corresponding embodiments shown in FIGS. 1, 2, 3 and 4.

Figure 6:
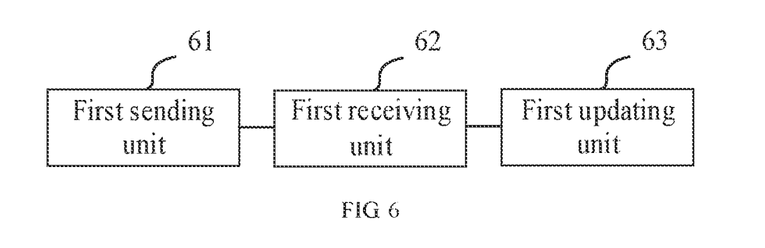
FIG. 6 illustrates a block diagram of an apparatus for updating the group member data according to some embodiments of the disclosure.

FIG. 6 is a block diagram of an apparatus for updating the group member data according to some embodiments. Referring to FIG. 6, the apparatus includes a first sending unit 61, a first receiving unit 62 and a first updating unit 63.

The first sending unit 61 is configured to send a group member data update request to a server; wherein the group member data update request carries a terminal timestamp.

The first receiving unit 62 is configured to receive the group member data change information issued by the server, where the group member data change information includes the group member change data between a current timestamp and the terminal timestamp, and the current timestamp is greater than the terminal timestamp.

The first update unit 63 is configured to update the group member data of a terminal based on the group member data change information.

Figure 7:
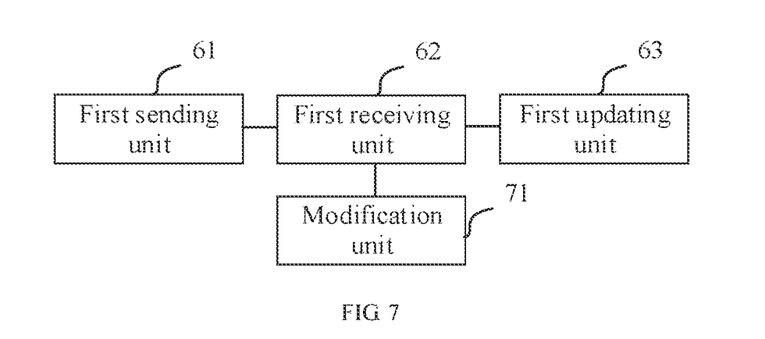
FIG. 7 illustrates a block diagram of an apparatus for updating the group member data according to some embodiments of the disclosure.

Further, FIG. 7 is a block diagram of an apparatus for updating the group member data according to some embodiments. Referring to FIG. 7, when the group member data change information includes the current timestamp, the first receiving unit 62 includes a modification unit 71.

The modification unit 71 is configured to determine the current timestamp as the terminal timestamp.

Figure 8:
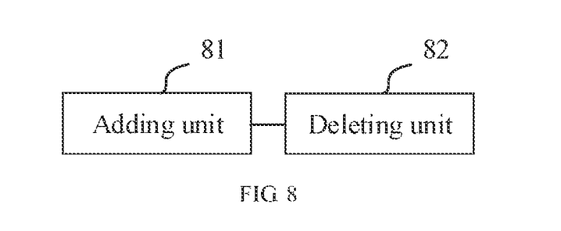
FIG. 8 illustrates a block diagram of an apparatus for updating the group member data according to some embodiments of the disclosure.

Further, FIG. 8 is a block diagram of an apparatus for updating the group member data according to some embodiments. Referring to FIG. 8, when the group member change data includes joining group member data and/or leaving group member data, the first updating unit 63 includes an adding unit 81 and/or a deleting unit 82.

The adding unit 81 is configured to obtain joining group member data in the group member data change information, and add the joining group member data to the group member data of the terminal.

The deleting unit 82 is configured to obtain leaving group member data in the group member data change information, and delete the leaving group member data from the group member data of the terminal.

Figure 9:
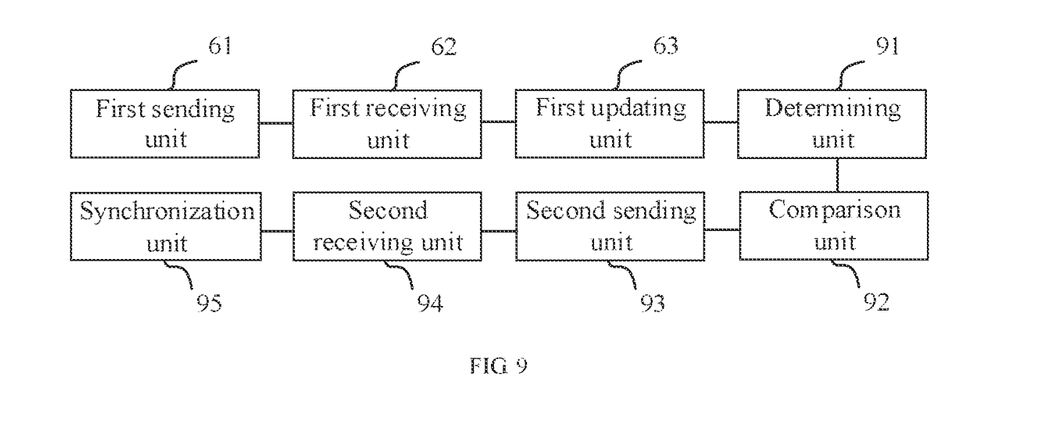
FIG. 9 illustrates a block diagram of an apparatus for updating the group member data according to some embodiments of the disclosure.

Furthermore, FIG. 9 is a block diagram of an apparatus for updating the group member data according to some embodiments. Referring to FIG. 9, when the group member data change information includes the md5 value of the group member data in the current timestamp, the apparatus further includes a determining unit 91, a comparison unit 92, a second sending unit 93, a second receiving unit 94, and a synchronization unit 95.

The determining unit 91 is configured to determine the md5 value of the updated group member data of the terminal after updating the group member data of the terminal based on the group member data change information.

The comparison unit 92 is configured to compare the md5 value of the group member data in the current timestamp with the md5 value of the updated group member data of the terminal.

The second sending unit 93 is configured to send a group member data synchronization request to the server in response to that the md5 value of the group member data in the current timestamp is different from the md5 value of the updated group member data of the terminal.

The second receiving unit 94 is configured to receive the group member data in the current timestamp issued by the server.

The synchronization unit 95 is configured to synchronize the group member data in the current timestamp to the group member data of the terminal.

In some embodiments, the apparatus for updating the group member data shown in the above embodiment is applied to an instant messaging application, and the group member data is the group member data of a group established in the instant messaging application.

Figure 10:
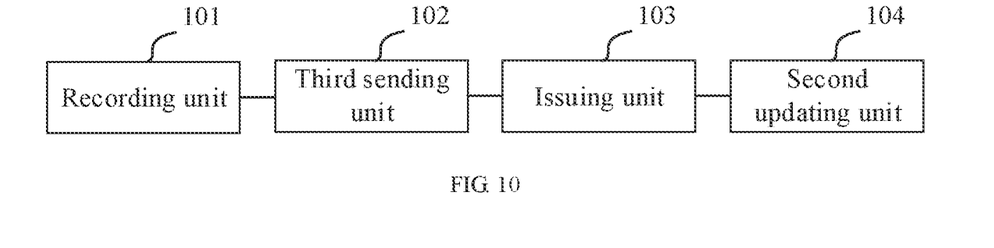
FIG. 10 illustrates a block diagram of an apparatus for updating the group member data according to some embodiments of the disclosure.

FIG. 10 is a block diagram of an apparatus for updating the group member data according to some embodiments. Referring to FIG. 10, the apparatus includes a recording unit 101, a third sending unit 102, an issuing unit 103 and a second updating unit 104.

The recording unit 101 is configured to detect the group member data periodically and record the group member data in a current timestamp by a server.

The third sending unit 102 is configured to send a group member data update request by a terminal to the server periodically, wherein the group member data update request carries a terminal timestamp.

The issuing unit 103 is configured to issue the group member data change information to the terminal by the server, where the group member data change information includes the group member change data between the current timestamp and the terminal timestamp, and the current timestamp is greater than the terminal timestamp.

The second update unit 104 is configured to update the group member data of the terminal based on the group member data change information by the terminal.

Regarding the apparatus in the above embodiment, the manner in which each module performs the operations has been described in detail in the embodiment related to the method, and will not be illustrated in detail here.

Figure 11:
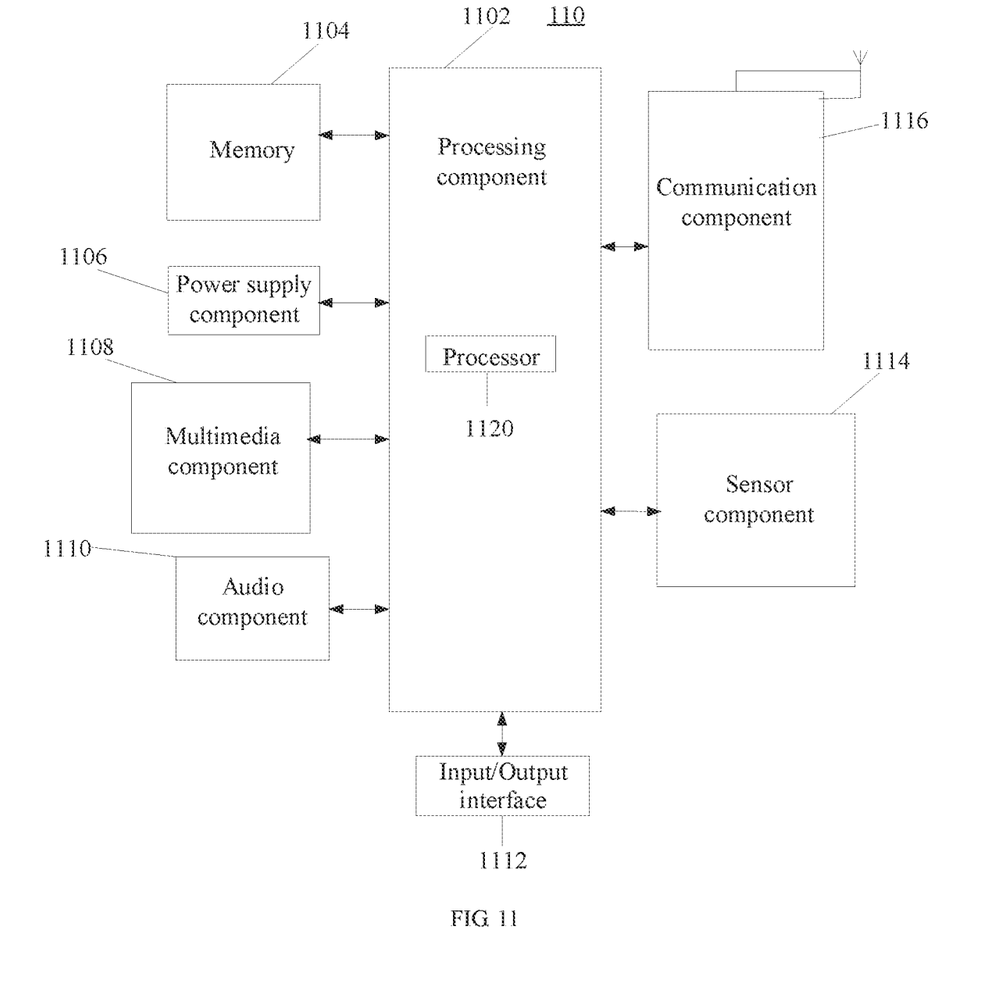
FIG. 11 illustrates a structural block diagram of a terminal according to some embodiments of the disclosure.

FIG. 11 is a block diagram of a terminal 110 for updating the group member data according to some embodiments. For example, the terminal 110 may be a mobile phone, computer, digital broadcasting terminal, message transceiver, game console, tablet device, medical device, fitness device, personal digital assistant, or the like.

Referring to FIG. 11, the terminal 110 may include one or more of: a processing component 1102, a memory 1104, a power supply component 1106, a multimedia component 1108, an audio component 1110, an Input/Output (I/O) interface 1112, a sensor component 1114, and a communication component 1116.

The processing component 1102 generally controls the overall operations of the terminal 110, such as operations associated with display, phone call, data communication, camera operation, and recording operation. The processing component 1102 may include one or more processors 1120 to execute instructions to perform all or a part of the steps of the above method. In addition, the processing component 1102 may include one or more modules to facilitate the interactions between the processing component 1102 and other components. For example, the processing component 1102 may include a multimedia module to facilitate the interactions between the multimedia component 1108 and the processing component 1102.

The memory 1104 is configured to store various types of data to support the operations of the device 1100. Examples of the data include instructions of any application or method operated on the terminal 110, contact person data, phone book data, messages, pictures, videos, and the like. The memory 1104 may be implemented by any type of volatile or nonvolatile storage device or a combination thereof, such as Static Random-Access Memory (SRAM), Electrically Erasable Programmable Read-Only Memory (EEPROM), Erasable Programmable Read-Only Memory (EPROM), Programmable Read-Only Memory (PROM). Read-Only Memory (ROM), magnetic memory, flash memory, magnetic disk or optical disk.

The power supply component 1106 provides power for various components of the terminal 110. The power supply component 1106 may include a power management system, one or more power supplies, and other components associated with generating, managing and distributing the power for the terminal 110.

The multimedia component 1108 includes a screen of an output interface provided between the terminal 110 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 1108 includes a front camera and/or a rear camera. When the device 1100 is in the operation mode such as shooting mode or video mode, the front camera and/or the rear camera may receive the external multimedia data. Each of the front camera and rear camera may be a fixed optical lens system or have the focal length and the optical zoom capability.

The audio component 1110 is configured to output and/or input audio signals. For example, the audio component 1110 includes a microphone (MIC). When the terminal 110 is in the operation mode such as call mode, recording mode and voice recognition mode, the microphone is configured to receive the external audio signals. The received audio signals may be further stored in the memory 1104 or transmitted via the communication component 1116. In some embodiments, the audio component 1110 further includes a speaker for outputting the audio signals.

The I/O interface 1112 provides an interface between the processing component 1102 and a peripheral interface module, where the above peripheral interface module may be a keyboard, a click wheel, buttons or the like. These buttons may include but not limited to: home button, volume button, start button, and lock button.

The sensor component 1114 includes one or more sensors for providing the terminal 110 with the state assessments in various aspects. For example, the sensor component 1114 may detect the opening/closing state of the device 1100, and the relative positioning of the components (for example, the display and keypad of the terminal 110). The sensor component 1114 may further detect the position change of the terminal 110 or a component of the terminal 110, the presence or absence of contact of the user with the terminal 110, the orientation or acceleration/deceleration of the terminal 110, and the temperature change of the terminal 110. The sensor component 1114 may include a proximity sensor configured to detect the presence of nearby objects with no physical contact. The sensor component 1114 may further include a light sensor, such as Complementary Metal Oxide Semiconductor (CMOS) or Charge Coupled Device (CCD) image sensor, for use in the imaging applications. In some embodiments, the sensor component 1114 may further include an acceleration sensor, a gyro sensor, a magnetic sensor, a pressure sensor, or a temperature sensor.

The communication component 1116 is configured to facilitate the wired or wireless communications between the terminal 110 and other devices. The terminal 110 may access a wireless network based on a communication standard, such as Wireless-Fidelity (WiFi), operator network (e.g., 2G 3G, 4G or 5G), or a combination thereof. In an exemplary embodiment, the communication component 1116 receives the broadcast signal or broadcast related information from an external broadcast management system via a broadcast channel. In an exemplary embodiment, the communication component 1116 further includes a Near Field Communication (NFC) module to facilitate the short-range communications. For example, the NFC module may be implemented based on the Radio Frequency Identification (RFID) technology, Infrared Data Association (IrDA) technology, Ultra Wideband (UWB) technology, Bluetooth (BT) technology and other technologies.

In an exemplary embodiment, the terminal 110 may be implemented by one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors or other electronic elements to perform the above method.

Figure 12:
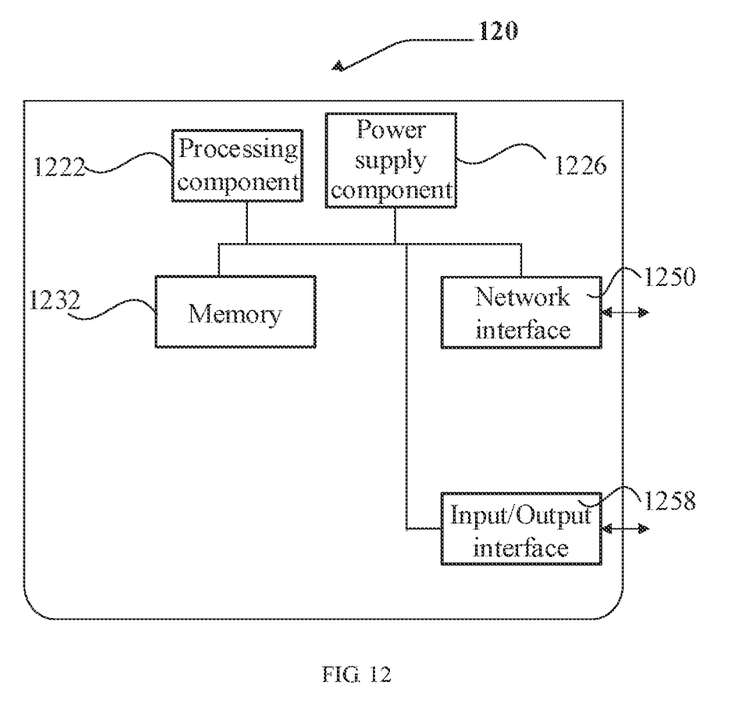
FIG. 12 illustrates a structural block diagram of a server according to some embodiments of the disclosure.

FIG. 12 is a block diagram of a server 120 in the system for updating the group member data according to some embodiments. Referring to FIG. 12, the server 120 includes a processing component 1222 which further includes one or more processors, and the memory resource represented by a memory 1232 for storing the instructions (e.g., application program) executable by the processing component 1222. The application program stored in the memory 1232 may include one or more modules, each of which corresponds to a set of instructions. In addition, the processing component 1222 is configured to execute the instructions to perform the above method.

The server 120 may further include a power supply component 1226 configured to perform the power management of the server 120, a wired or wireless network interface 1250 configured to connect the server 120 to a network, and an Input/Output (I/O) interface 1258. The server 120 may operate based on an operating system stored in the memory 1232, e.g., Windows, Server™, Mac OS X™, Unix™, Linux™, FreeBSD™ or the like.

In some embodiments, a non-transitory computer readable storage medium including instructions, for example, the memory 1104 including instructions, is further provided. The above instructions can be executed by the processor 1120 of the terminal 110 to perform the above method. For example, the non-transitory computer readable storage medium may be ROM, Random-Access Memory (RAM), Compact Disc Read-Only Memory (CD-ROM), magnetic tape, floppy disk, optical data storage device, or the like.

In some embodiments, a computer program is further provided. The computer program includes: computer readable codes. For example, the terminal performs the above method for updating the group member data when the computer readable codes run on the terminal.

Those skilled in the art can understand that the disclosure includes devices for performing one or more of the operations described in the disclosure. These devices may be specially designed and manufactured for the required purpose, or may also include known devices in general-purpose computers. These devices have computer programs stored therein, where these computer programs are selectively activated or reconfigured. Such computer programs may be stored in a device (e.g., computer) readable medium or in any type of medium suitable for storing electronic instructions and coupled respectively to a bus. The computer readable medium includes but not limited to any type of disk (including floppy disk, hard disk, compact disc, CD-ROM, and magnetic optical disc), Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is, the readable medium includes any medium that stores or transmits the information in a readable form by a device (e.g., a computer).

Figure 13:
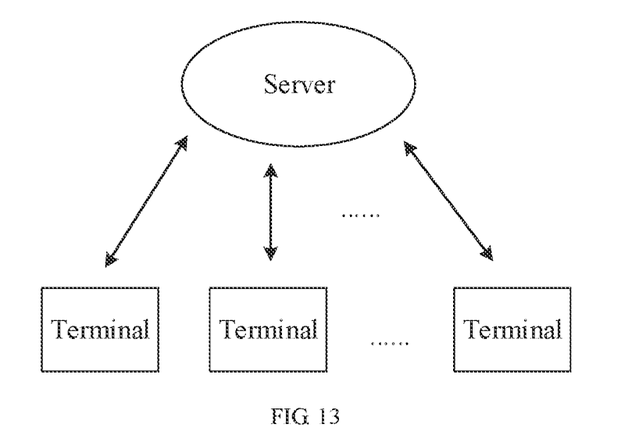
FIG. 13 illustrates a block diagram of a system according to some embodiments of the disclosure.

FIG. 13 is a block diagram of a system 130 according to some embodiments. Referring to FIG. 13, the system 130 may include a server 131 and at least one terminal 132.

The server includes a processor and a memory configured to store instructions executable by the processor; wherein the processor is configured to perform the steps in the above method where the execution subject is the server.

The terminal includes a processor and a memory configured to store instructions executable by the processor; wherein the processor is configured to perform the steps in the above method where the execution subject is the terminal.

Figure 14:
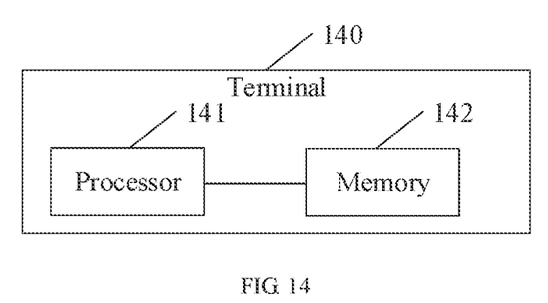
FIG. 14 illustrates a structural block diagram of another terminal according to some embodiments of the disclosure.

An embodiment of the disclosure further provides a terminal 140, as shown in FIG. 14, including: a processor 141; a memory 142 configured to store instructions executable by the processor 141. The processor 141 is configured to: when one or more programs are executed by one or more processors 141, cause the one or more processors 141 to perform: sending a group member data update request to a server, wherein the group member data update request carries a terminal timestamp to a server; receiving group member data change information issued by the server, wherein the group member data change information includes group member change data between a current timestamp and the terminal timestamp, and the current timestamp is greater than the terminal timestamp; updating the group member data of a terminal based on the group member data change information.

In some embodiments, the processor 141 is further configured to: determine the current timestamp as the terminal timestamp.

In some embodiments, the group member change data includes joining group member data and/or leaving group member data;

The processor 141 is configured to: obtain the joining group member data in the group member data change information, and add the joining group member data to the group member data of the terminal; and/or obtain the leaving group member data in the group member data change information, and delete the leaving group member data from the group member data of the terminal.

In some embodiments, the group member data change information includes the md5 value of the group member data in the current timestamp; and the processor 141 is further configured to: determine the md5 value of the updated group member data of the terminal; compare the md5 value of the group member data in the current timestamp with the md5 value of the updated group member data of the terminal; send a group member data synchronization request to the server in response to that the md5 value of the group member data in the current timestamp is different from the md5 value of the updated group member data of the terminal; receive the group member data in the current timestamp issued by the server; synchronize the group member data in the current timestamp to the group member data of the terminal.

In some embodiments, the terminal is applied to an instant messaging application, and the group member data is the group member data of a group established in the instant messaging application.

What is claimed is:

1. A method for updating group member data, comprising:
sending a group member data update request to a server, wherein the group member data update request carries a terminal timestamp;
receiving a group member data change information issued by the server, wherein the group member data change information comprises data of a changed group member between a current timestamp and the terminal timestamp, and the current timestamp is greater than the terminal timestamp, wherein the group member data change information comprises an md5 value of a group member data in the current timestamp, and the data of the changed group member comprises at least one of the following data: a joining group member data, and a leaving group member data;
updating a group member data of a terminal based on the group member data change information; obtaining data of a member in the data of the changed group member, adding the data of the member in the data of the changed group member to the group member data of the terminal and determining a status of the member corresponding to the data of the member in the data of the changed group member as joining group in response to that the data of the member in the data of the changed group member is not included in the group member data currently stored by the terminal, wherein the corresponding data is the joining group member data including the status of the member and the member's own data; and deleting the data of the member in the data of the changed group member from the group member data of the terminal and determining the status of the member as leaving the group in response to that the data of the member is included in the group member data currently stored by the terminal, wherein the corresponding data is the leaving group member data including the status of the member and the member's own data, wherein the member's own data comprises an identification of the member and a changed timestamp;
determining an md5 value of the updated group member data of the terminal;
comparing the md5 value of the group member data in the current timestamp with the md5 value of the updated group member data of the terminal;
synchronizing the group member data in the current timestamp to the group member data of the terminal in response to that the md5 value of the group member data in the current timestamp is different from the md5 value of the updated group member data of the terminal;
determining the current timestamp as the terminal timestamp, wherein the group member data change information comprises the current timestamp;
sending a group member data synchronization request to the server; and
receiving the group member data in the current timestamp issued by the server, wherein the method is applied to an instant messaging application, and the group member data is group member data of a group established in the instant messaging application.

2. A method for updating group member data, comprising:
detecting, by a server, a group member data periodically and recording a group member data in a current timestamp;
sending, by a terminal, a group member data update request to the server periodically, wherein the group member data update request carries a terminal timestamp;
issuing, by the server, a group member data change information to the terminal, wherein the group member data change information comprises data of a changed group member between the current timestamp and the terminal timestamp, and the current timestamp is greater than the terminal timestamp, wherein the group member data change information comprises an md5 value of a group member data in the current timestamp, and the data of the changed group member comprises at least one of the following data: a joining group member data, and a leaving group member data;

updating, by the terminal, the group member data of the terminal based on the group member data change information;

obtaining data of a member in the data of the changed group member, adding the data of the member in the data of the changed group member to the group member data of the terminal and determining a status of the member corresponding to the data of the member in the data of the changed group member as joining group in response to that the data of member in the data of the changed group member is not included in the group member data currently stored by the terminal, wherein corresponding data is the joining group member data including the status of the member and the member's own data; and deleting the data of the member in the data of changed group member from the group member data of the terminal and determining the status of the member as leaving group in response to that the data of the member in the data of changed group member is included in the group member data currently stored by the terminal, wherein the corresponding data is the leaving group member data including the status of the member and the member's own data, wherein the member's own data comprises an identification of the member and a changed timestamp;

determining an md5 value of the updated group member data of the terminal;

comparing the md5 value of the group member data in the current timestamp with the md5 value of the updated group member data of the terminal;

synchronizing the group member data in the current timestamp to the group member data of the terminal in response to that the md5 value of the group member data in the current timestamp is different from the md5 value of the updated group member data of the terminal;

determining the current timestamp as the terminal timestamp, wherein the group member data change information comprises the current timestamp;

sending a group member data synchronization request to the server; and receiving the group member data in the current timestamp issued by the server, wherein the method is applied to an instant messaging application, and the group member data is group member data of a group established in the instant messaging application.

3. A terminal for updating group member data, comprising:

a processor;

a memory configured to store executable instructions by the processor;

wherein the processor is configured to:

send a group member data update request to a server, wherein the group member data update request carries a terminal timestamp;

receive a group member data change information issued by the server, wherein the group member data change information comprises data of a changed group member between a current timestamp and the terminal timestamp, and the current timestamp is greater than the terminal timestamp, wherein the group member data change information comprises an md5 value of group member data in the current timestamp, and the data of the changed group member comprises at least one of the following data: a joining group member data, and a leaving group member data;

update a group member data of a terminal based on the group member data change information; obtain data of a member in group in the data of the changed group member, add the data of the member in the data of changed group member to the group member data of the terminal and determine a status of the member corresponding to the data of member in the data of the changed group member as joining the group in response to that the data of the member in the data of changed group member is not included in the group member data currently stored by the terminal, wherein the corresponding data is the joining group member data including the status of the member and the member's own data; and delete the data of the member in the data of changed group member from the group member data of the terminal and determine the status of the member as leaving the group in response to that the data of the member in the data of the changed group member is included in the group member data currently stored by the terminal, wherein the corresponding data is the leaving group member data including the status of the member and the member's own data, wherein the member's own data comprises an identification of the member and a changed timestamp;

determine an md5 value of the updated group member data of the terminal;

compare the md5 value of the group member data in the current timestamp with the md5 value of the updated group member data of the terminal;

synchronize the group member data in the current timestamp to the group member data of the terminal in response to that the md5 value of the group member data in the current timestamp is different from the md5 value of the updated group member data of the terminal;

determine the current timestamp as the terminal timestamp, wherein the group member data change information comprises the current timestamp;

send a group member data synchronization request to the server; and receive the group member data in the current timestamp issued by the server, wherein the method is applied to an instant messaging application, and the group member data is group member data of a group established in the instant messaging application.

* * * * *